United States Patent [19]
Jones

[11] Patent Number: 4,472,651
[45] Date of Patent: Sep. 18, 1984

[54] PERMANENT MAGNET ROTOR

[75] Inventor: Donald W. Jones, Burnt Hills, N.Y.

[73] Assignee: General Electric Company, Schenectady, N.Y.

[21] Appl. No.: 534,991

[22] Filed: Sep. 22, 1983

[51] Int. Cl.³ .......................................... H02K 21/12
[52] U.S. Cl. ................................... 310/156; 310/216; 310/217
[58] Field of Search ............... 310/216, 217, 256, 258, 310/259, 261, 42

[56] References Cited

U.S. PATENT DOCUMENTS

| | | | |
|---|---|---|---|
| 1,286,013 | 11/1918 | Jeannin | 310/216 |
| 1,305,604 | 6/1919 | Holy | 310/216 |
| 2,680,822 | 6/1954 | Brainard | 310/156 X |
| 3,597,835 | 8/1971 | Scaillet | 310/216 |
| 4,117,360 | 9/1978 | Richter | 310/183 |
| 4,139,790 | 2/1979 | Steen | 310/156 |
| 4,214,182 | 7/1980 | Keim | 310/216 |

FOREIGN PATENT DOCUMENTS 1164 of 1894 United Kingdom ............... 310/216

Primary Examiner—Mark O. Budd
Attorney, Agent, or Firm—Mark L. Mollon; James C. Davis, Jr.; Marvin Snyder

[57]  ABSTRACT

A rotor for a permanent magnet machine comprises an even plurality of pole pieces joined together by intermediate nonmagnetic segments to form a hollow cylinder. A plurality of magnets is situated adjacent to the interior portion of the pole pieces, with the magnets defining a central axial opening. A rotor core has a plurality of saucer shaped elements arranged in a stack situated inside the central opening. Means for providing opposing axial forces to the rotor core tend to flatten the saucer shaped elements and thereby cause radial expansion of the rotor core holding the magnets against the interior of the hollow cylinder.

6 Claims, 7 Drawing Figures

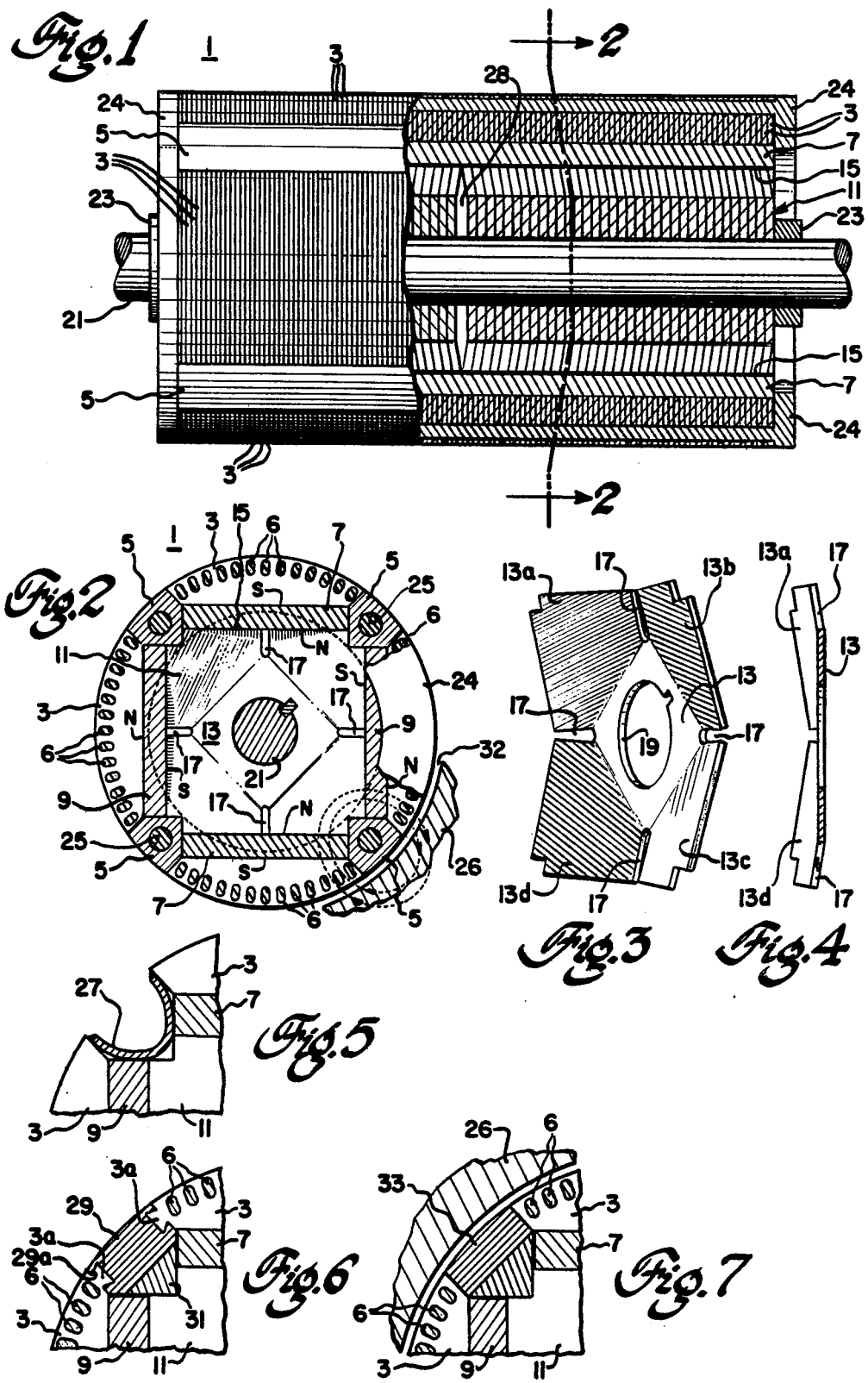

PERMANENT MAGNET ROTOR

BACKGROUND OF THE INVENTION

This invention relates to permanent magnet dynamo electric machines and more specifically to permanent magnet dynamo electric AC machines with the permanent magnets located in the interior of the rotor.

Alternating current electric motors and generators are sometimes excited or magnetized by means of permanent magnets because this leads to machines of simple, robust construction having high efficiency and being free of slip rings or commutators.

There is a need for adequate mechanical support of the permanent magnets situated in the interior of the rotor of a permanent magnet machine. The magnets, as well as the surrounding structures are subject to various systems of forces arising from thermal expansion, rotation and residual forces from the manufacturing process, such as distortion from welding.

In previous permanent magnet rotor designs, such as the one shown in Richter's U.S. Pat. No. 4,117,360, issued Sept. 26, 1978, and assigned to the instant assignee, a composite shrink ring of magnetic and nonmagnetic pieces welded together is used to hold the magnet and the remaining rotor assembly. The pole pieces and rotor assembly are solid pieces of magnetic material.

In copending application Ser. No. 315,333, filed Oct. 26, 1981, and assigned to the instant assignee, a prism of magnetic material separated along a plane parallel to a flux line has a planar spring disposed between the sections to force the "V" arranged magnets against the pole pieces.

In copending application Ser. No. 453,665, filed Dec. 27, 1982, and assigned to the instant assignee, north and south pole pieces are separated by clamp pieces to form a hollow cylinder. A shaft of magnetic material with a central portion of rhombic cross section is positioned in the cylinder. As bolts extending through the clamp pieces engage matching surfaces on the edges of the pole pieces, the pole pieces are drawn toward the shaft, and in doing so clamp the magnets located adjacent the sides of the magnet in compression to form a solid structure.

In copending application Ser. No. 453,666, filed Dec. 27, 1982, and assigned to the instant assignee a permanent magnet rotor has a north and south pole piece each separated into two sections by a central nonmagnetic insert. The pole piece sections are welded to the central nonmagnetic insert, and two nonmagnetic segments are welded to either end of the south pole piece to form two half rings. The half rings are secured about a solid shaft of magnetic material having a central portion with a rhombic cross section. The central line of the half rings is aligned with the diagonal of the rhombic central portion. The half rings are bolted to one another. The sides of the shaft and the inner faces of the half rings form four apertures extending the axial length of the pole pieces. A magnet which adds no structural strength to the rotor is positioned in each of the apertures, respectively.

It is an object of the present invention to provide a rotor for a permanent magnet machine which can be fabricated by standard manufacturing processes such as punching and pressing and requires a minumum of machining.

It is a further object of the present invention to provide a rotor for a permanent magnet machine that does not require bolts extending in the radial direction to provide radial tightening.

SUMMARY OF THE INVENTION

In one aspect of the present invention, an interior permanent magnet motor is provided having an even plurality of arcuate shaped pole pieces of magnetic material joined together circumferentially by intermediate nonmagnetic segments to form a hollow cylinder. A plurality of magnets are situated adjacent to the interior portion of the pole pieces with the magnets defining a central opening. A rotor core is situated inside the central opening formed by the magnets. The rotor core comprises a plurality of generally saucer shaped elements arranged in a stack with the saucer shaped elements defining a central aperture extending in the axial direction in which a shaft is situated. Means for providing opposing axial forces to the rotor core to flatten the saucer shaped sections causes radial expansion of the rotor core to hold the mangets against the interior of the hollow cylinder formed by the pole pieces and intermediate sections.

In another aspect of the present invention, a method of assembling a permanent magnet machine comprises the steps of forming a hollow cylinder of arcuate shaped pole pieces of magnetic material separated by nonmagnetic segments. A plurality of magnets are then placed inside the ring adjacent to the pole pieces, with the magnets defining a central axial opening. Next, a rotor core having a stack of generally saucer shaped elements is placed inside the central axial opening. Lastly, the rotor core is compressed in the axial direction which tends to flatten the saucer shaped elements to cause radial expansion of the rotor core to hold the magnets against the interior of the hollow cylinder.

BRIEF DESCRIPTION OF THE DRAWING

While the specification concludes with claims particularly pointing out and distinctly claiming the present invention, the objects and advantages of the invention can be more readily ascertained from the following description of the preferred embodiment when used in conjunction with the accompanying drawing in which:

FIG. 1 is a side view partially in section of a permanent magnet rotor in accordance with the present invention;

FIG. 2 is a partial sectional view along the lines 2—2 of FIG. 1;

FIG. 3 is a perspective view of a single saucer shaped element from the rotor of FIG. 1;

FIG. 4 is a side view of the distal half of the saucer shaped element of the rotor of FIG. 1, viewed in a direction perpendicular to the rotor axis at its point of contact therewith; and FIG. 5, 6 and 7 are other embodiments in accordance with the present invention of the rotor of FIG. 1, shown as partial sectional views, with the rotor of FIG. 7 shown positioned in the bore of a stator also shown in partial sectional view.

DETAILED DESCRIPTION OF THE INVENTION

Referring now to FIGS. 1 and 2, a four pole interior permanent magnet rotor 1 is shown. Arcuate shaped pole pieces 3 are circumferentially separated from one another by intermediate nonmagnetic segments 5. The pole pieces are of magnetic material such as silicon steel and are preferably laminated to reduce eddy current losses during machine operation. The intermediate nonmagnetic segments can be nonlaminated and fabricated, for example, of austenitic stainless steel and welded to the laminated pole pieces by electron beam welding, tungsten inert gas welding or metal inert gas welding, for example, to form a hollow cylinder. Amortisseur slots 6 located around the periphery of the pole pieces and aligned to extend along the axial length of the lamination stack can be provided if amortisseur windings are desired. The apertures, if provided, are subsequently filled by injection molding with aluminum and short circuited on either end with end rings 24. The amortisseur windings can provide a cage for line starting of the synchronous motor and/or help secure the rotor laminations.

When the rotor is to be used in a synchronous motor supplied by a variable frequency power source, a cage is not required and may in fact not be desirable, due to the changes in the electrical characteristics of the motor with the cage present. Magnets 7 are positioned adjacent to the interior face of one pair of opposite pole pieces 3 and magnets 9 are positioned adjacent to the other pair of opposite pole pieces 3. Magnets 7 have their south seeking faces adjacent to the pole pieces and magnets 9 have their north seeking faces adjacent to the pole pieces providing alternate north south north south poles circumferentially distributed about the periphery of the rotor. While a four pole rotor has been shown, a rotor of any even number of poles can be fabricated in accordance with the present invention.

A rotor core 11 comprises a plurality of generally saucer shaped elements 13 stacked in the axial direction. The saucer shaped sections shown are arranged in two stacks of nested sections with the concave portion of the two stacks facing one another as evident by gap 28 shown in FIG. 1. Other stacking arrangements are also possible, such as alternate concave and convex sections or having all the sections nested (that is each concave section positioned on the adjacent convex section) or two or more sections with convex faces facing one another. A sheet of magnetic material 15 such as mild (low carbon) steel can be placed between the rotor core and the magnets, to distribute the clamping pressure on the magnets evenly. The generally saucer shaped elements 13 can be stamped from square sheets of steel coned into saucer shape by bending the corners 13a, 13b, 13c and 13d of the sheet to form surfaces in five planes, as can be more easily seen in FIGS. 3 and 4. The corners are all bent a predetermined number of degrees in the same direction from the plane of the sheet. Slots 17 can be stamped in the saucer shaped elements to tailor their stiffness. Alternatively, the saucer shaped elements could be formed by dishing flat sheets of steel to form dished elements.

The rotor core 11 has a central aperture 19 extending in a radial direction to accommodate a keyed shaft 21. The magnets 7 and 9 are held firmly in the hollow cylinder formed by the pole pieces 3 and intermediate nonmagnetic segments 5, by the axial forces created by press rings 23 located on the shaft in contact with the cylinder faces. A threaded nut on the other end of the shaft could alternatively be used to provide the axial compressive force. If amortisseur windings 6 and end rings 24 are desired, aluminum is also cast in the voids 25 of the intermediate segments 5. When amortisseur windings and aluminum casting are not used, nonmagnetic end plates can be used on either end of the stack secured in place by the threaded nut or press ring 23.

The axial forces created by the nut or press ring 23 tend to flatten the saucer shaped elements 13, providing radial expansion of the core 11 to hold the magnets 7 and 9 against the inner walls of the cylinder. The mild steel plate 15, if used, acts as a cushion to reduce cracking of the magnets due to the sharp punched edges of the saucer shaped elements. The thickness of the saucer shaped elements can be greater than the thickness of the pole piece laminations since the alternating flux seen by the rotor core during machine operation is much less than that seen by the pole pieces. If cracks develop in the magnets which can be ferrite, cobalt samarium, alnico or other magnet material, the magnets are still retained in their slots.

Typical flux paths in the rotor, shown in FIG. 2 by the dashed lines with arrows, begin in magnet 9 and extend into the adjacent pole piece 3. The flux then crosses the air gap 32 and interacts with the stator winding of the stator 26, returning across the air gap through the pole pieces through adjacent magnet 7 and through the saucer shaped element to the south seeking face of magnet 9. The interaction of the rotor flux with the field created by the stator windings creates motor torque. The rotor can be used with an ac motor stator having the desired number of phase windings.

Referring now to FIG. 5, another embodiment of the present invention is shown. A "U" shaped channel 27 extending in the axial direction is shown as the intermediate nonmagnetic segment and is welded between each of the pole pieces 3 by metal inert gas welding, tungsten inert gas welding, electron beam welding or brazing. The "U" shaped channels add resiliency to the ring structure of the hollow cylinder to allow for less stringent dimensional tolerances on the parts and allow the parts to remain tight in the presence of temperature gradients in the rotor structure. The "U" shaped channel could, for example, be fabricated of austenitic stainless steel. This rotor does not have amortisseur windings.

Referring now to FIG. 6, another embodiment of the present invention is shown with a dovetail intermediate section 29. A tenon shaped projection 3a on the pole pieces fits in a corresponding mortice 29a in the intermediate section 29.

Referring now to FIG. 7, another embodiment of the rotor of the present invention is shown situated in the bore of a stator 26. The intermediate nonmagnetic segment 33 is welded to the pole pieces 3.

A method of assembling the rotor core 11 comprises the steps of forming a hollow cylinder of arcuate shaped pole pieces 3 of magnetic material separated by nonmagnetic segments 5, defining a central axial opening. A rotor core comprised of a plurality of generally saucer shaped elements 13 is placed inside the central axial opening. The rotor core is then compressed in the axial direction tending to flatten the saucer shaped elements, causing radial expansion of the rotor core to hold the magnetic material against the inner sides of the hollow cylinder formed of pole pieces 3 and intermediate sections 5. The saucer shaped elements 13 do not have to be completely flattened to provide sufficient radial force to hold the magnets in place. If injection molding of aluminum is desired the aluminum can be injected in the aperture between the intermediate segments and the magnets and any axial openings in the pole pieces. The injected aluminum can also be used to form end rings 24 on the rotor. A central shaft 21 extending axially through the rotor can have threaded nuts or press rings 23 on either end to flatten the saucer shaped elements 13 of the rotor core. Alternatively, stub shafts (not shown) can be used on either face on the cylindrical rotor, rather than an axial through shaft. Through bolts (not shown) extending, for example, axially through the apertures between the intermediate sections and the magnets could draw the stub shafts toward one another providing the compression in the axial direction to tend to flatten the saucer shaped elements.

The foregoing describes a rotor for a permanent magnet dynamo electric machine which can be fabricated by standard manufacturing processes such as punching and aluminum injection and requires a minimum of machining. The rotor described does not require bolts extending in the radial direction to provide radial tightening of the magnets in their slots.

While the invention has been particularly shown and described with reference to several preferred embodiments thereof, it will be understood by those skilled in the art that various changes in form or details may be made without departing from the spirit and scope of the invention.

What is claimed is:

1. An interior permanent magnet rotor comprising:
   an even plurality of arcuate shaped pole pieces of magnetic material;
   a plurality of intermediate nonmagnet segments, said arcuate shaped pole pieces of magnetic material joined together circumferentially by said intermediate nonmagnetic segments, said pole pieces and nonmagnetic segments forming a hollow cylinder;
   a plurality of magnets situated adjacent to the interior portion of said pole pieces, said magnets defining a central axial opening;
   a rotor core situated inside said central opening and having a plurality of generally saucer shaped elements in a stack, said saucer shaped elements defining a central aperture extending in the axial direction;
   a shaft situated in said central aperture defined by said rotor core; and
   means for providing opposing axial forces to said rotor core to tend to flatten said saucer shaped element and thereby cause radial expansion of the rotor core to hold said magnets against the interior of the hollow cylinder.

2. The rotor of claim 1 wherein each of said generally saucer shaped elements comprises a polygonal sheet of steel having each corner section bent a predetermined number of degrees in the same direction from the plane of the polygonal sheet.

3. The rotor of claim 1 wherein said stack of saucer shaped elements comprises two nested stacks of saucer shaped elements, the concave portions of said nested stacks facing one another.

4. The rotor of claim 1 wherein said means for providing opposing axial forces comprises a threaded nut on either end of said shaft compressing said stack.

5. The rotor of claim 1 wherein said means for providing opposing axial forces comprises a pressed ring on either end of said shaft compressing said stack.

6. The rotor of claim 1 wherein each of said intermediate nonmagnetic segments comprises a "U" shaped channel on nonmagnetic material welded on either side to said pole pieces, said "U" shaped channel adding resiliency to the ring structure of said hollow cylinder.

* * * * *